United States Patent
Weber et al.

(10) Patent No.: US 9,398,257 B2
(45) Date of Patent: Jul. 19, 2016

(54) METHODS AND SYSTEMS FOR SHARING A PLURALITY OF ENCODERS BETWEEN A PLURALITY OF ENDPOINTS

(71) Applicant: Blue Jeans Network, Mountain View, CA (US)

(72) Inventors: Emmanuel Weber, San Jose, CA (US); Michael Grupenhoff, Palo Alto, CA (US); Oded Gal, Palo Alto, CA (US)

(73) Assignee: Blue Jeans Network, Mountain View, CA (US)

( * ) Notice: Subject to any disclaimer, the term of this patent is extended or adjusted under 35 U.S.C. 154(b) by 205 days.

(21) Appl. No.: 14/216,544

(22) Filed: Mar. 17, 2014

(65) Prior Publication Data

US 2014/0267570 A1 Sep. 18, 2014

Related U.S. Application Data

(60) Provisional application No. 61/798,789, filed on Mar. 15, 2013, provisional application No. 61/803,330, filed on Mar. 19, 2013.

(51) Int. Cl.
*H04N 7/14* (2006.01)
*H04N 7/15* (2006.01)

(52) U.S. Cl.
CPC . *H04N 7/15* (2013.01); *H04N 7/148* (2013.01)

(58) Field of Classification Search
CPC ......... H04L 47/10; H04L 47/12; H04L 47/18; H04L 47/20; H04L 47/22; H04L 47/225; H04L 47/38; H04L 47/52; H04L 47/70; H04L 47/72; H04L 47/74; H04L 47/78; H04L 47/80; H04M 3/56–3/569; H04M 2203/50–2203/509; H04W 28/02; H04W 28/0215; H04W 28/0247; H04W 28/0252; H04W 28/0257; H04W 28/0263; H04W 28/0268; H04W 28/0273

USPC ............... 348/14.01–14.16; 370/259–271, 370/351–357, 229–240; 379/201.01, 379/202.01–207.01; 709/201–207, 709/217–248

See application file for complete search history.

(56) References Cited

U.S. PATENT DOCUMENTS

| | | | |
|---|---|---|---|
| 7,555,006 B2 * | 6/2009 | Wolfe et al. | 370/465 |
| 8,073,951 B1 * | 12/2011 | Young | 709/226 |
| 8,224,885 B1 * | 7/2012 | Doucette et al. | 709/201 |
| 8,289,368 B2 * | 10/2012 | Gopal et al. | 348/14.09 |
| 8,482,593 B2 | 7/2013 | Periyannan et al. | |
| 8,514,263 B2 | 8/2013 | Periyannan et al. | |
| 8,875,031 B2 | 10/2014 | Periyannan et al. | |
| 8,885,013 B2 | 11/2014 | Periyannan et al. | |
| 9,035,997 B2 | 5/2015 | Periyannan et al. | |
| 9,041,765 B2 | 5/2015 | Periyannan et al. | |
| 9,124,757 B2 | 9/2015 | Weber | |
| 9,143,729 B2 | 9/2015 | Anand et al. | |
| 9,232,191 B2 | 1/2016 | Periyannan et al. | |
| 2012/0284409 A1 | 11/2012 | Lee et al. | |
| 2013/0034146 A1 | 2/2013 | Jeong et al. | |
| 2014/0092203 A1 | 4/2014 | Periyannan et al. | |
| 2014/0267572 A1 * | 9/2014 | Bright-Thomas | 348/14.09 |

OTHER PUBLICATIONS

"Multiparty Video Calling that Goes Where You Go", LifeSize UVC Multipoint, Logitech (2012), 2 pgs.

* cited by examiner

*Primary Examiner* — Hemant Patel
(74) *Attorney, Agent, or Firm* — Ascenda Law Group, PC

(57) ABSTRACT

Described herein are methods and systems for assigning a plurality of endpoints of a video conference system to a plurality of encoders located on a server of the video conference system. At least a first group of the endpoints is assigned to first one of the encoders, and at least a second group of the endpoints, the second group disjoint from the first group, is assigned to a second one of the encoders.

20 Claims, 10 Drawing Sheets

METHODS AND SYSTEMS FOR SHARING A PLURALITY OF ENCODERS BETWEEN A PLURALITY OF ENDPOINTS

CROSS REFERENCE TO RELATED APPLICATIONS

This application is a NON-PROVISIONAL of, claims priority to, and incorporates by reference in its entirety U.S. Provisional Application No. 61/798,789, filed on Mar. 15, 2013, and U.S. Provisional Application No. 61/803,330, filed on Mar. 19, 2013.

FIELD OF THE INVENTION

The present invention relates to methods and systems for interfacing a plurality of endpoints of a video conference system with a plurality of encoders at a server of the video conference system.

BACKGROUND

In previous video conferencing methods and systems, there may be a 1 to 1 mapping between endpoints and encoders, as depicted in FIG. 3. Alternatively, there may be an n to 1 mapping between endpoints and encoders (i.e., mapping from n endpoints to 1 encoder), as depicted in FIG. 4. A drawback of the first approach is that it is expensive to deploy due to the high number of encoders relative to the number of endpoints. A drawback of the second approach is that it provides a relatively low encoding quality, because the audio/video streams must be encoded using the capabilities of the lowest bit-rate endpoint out of the group of endpoints.

SUMMARY

An object of the present invention is to provide methods and systems for video conferencing in which many endpoints may be connected to a small number of encoders. Another object of the present invention is to provide methods and systems for video conferencing in which a small number of working points allow for a wide range of endpoint capabilities (e.g., wide range of resolution and bandwidth).

These and further embodiments of the present invention are discussed herein.

BRIEF DESCRIPTION OF THE DRAWINGS

The present invention is illustrated by way of example, and not limitation, in the figures of the accompanying drawings in which.

DETAILED DESCRIPTION

Figure 1:
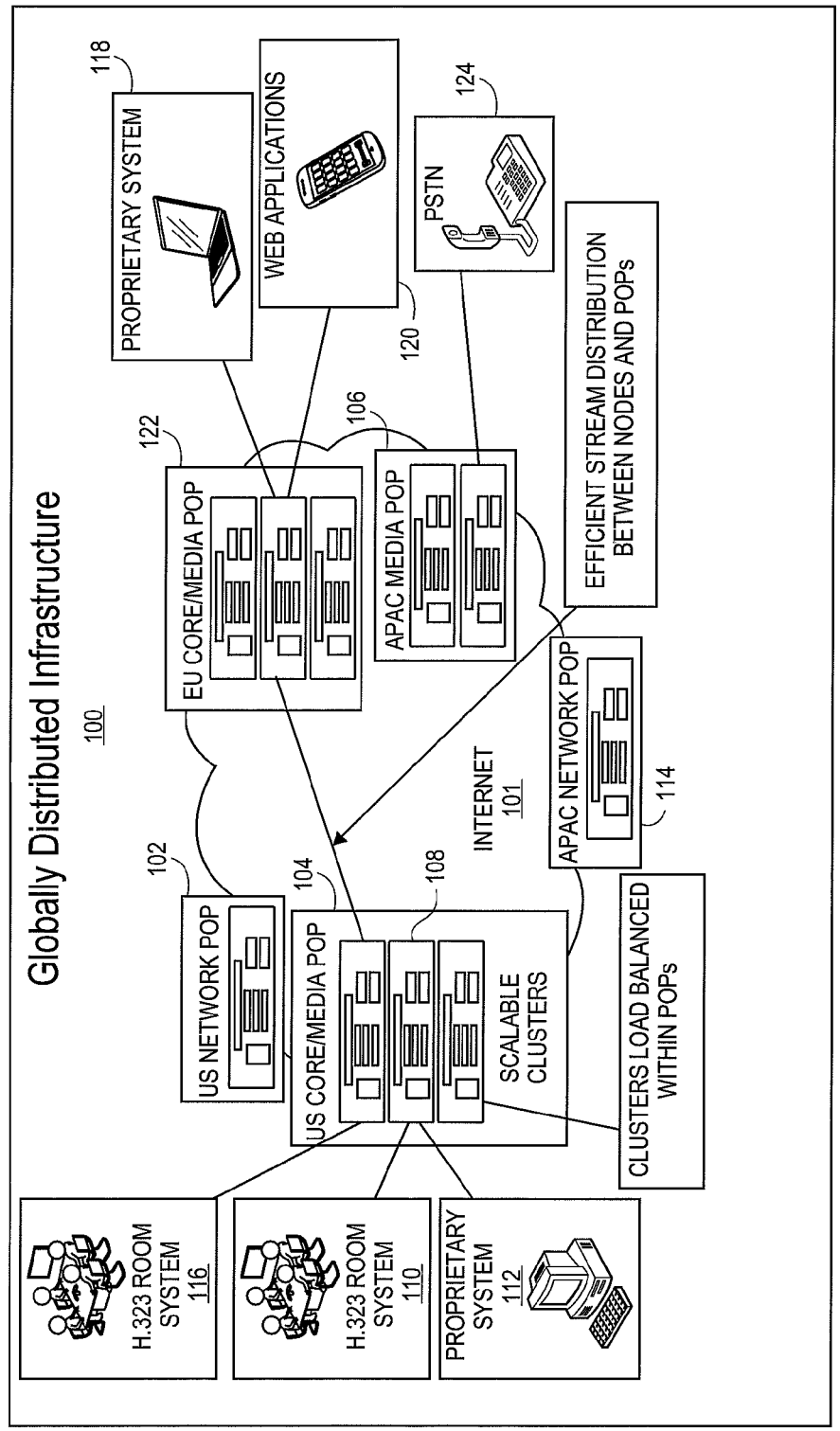
FIG. 1 depicts an exemplary system, in accordance with some embodiments of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

In one embodiment of the present invention, the number of working points is determined statistically using the capabilities of the endpoints. Once the working points are established, one encoder is created for each working point. All of the encoders may work in conjunction with one another, sharing the majority of the encoding process. Only a small amount of extra-CPU resources may be needed for each additional encoder.

In one embodiment of the present invention, each endpoint, when it connects to the video conference system, gets assigned to the best encoder that can service it, based on parameters such as the resolution needed by the endpoint and the bandwidth available to the endpoint. As any of these parameters may vary during the call, the endpoint may be dynamically switched to a different encoder that is operating at a different working point.

Various techniques of the present invention may be applied to both a unidirectional streaming video application or to a bi-directional interactive video application. Various techniques of the present invention may additionally be used with existing video codecs that follow an open standard in such a way that endpoints connecting to the encoders do not need to be modified in any way and are not aware of multiple encoders being present. This allows unmodified endpoints to be used. Various techniques of the present invention may be used in a variety of contexts including, but not limited to, presentation sharing, screen sharing, motion video and the like. Since embodiments of the present invention may work with open standard video codecs, these embodiments avoid the need to use a proprietary codec for screen sharing to achieve a large fan-out of presentation receivers. Most systems on the market today resort to using a proprietary video codec to send screen sharing, whereas some embodiments of the present invention can use an open standard video codec and hence be compatible with many off-the-shelf endpoints that can receive this screen sharing stream.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011 (issued as U.S. Pat. No. 9,035,997 on May 19, 2015), U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016), U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015), U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014), U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014), U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015), and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services are provided in U.S. patent application Ser. No. 13/105,684, entitled "Systems and Methods for Real-Time Multimedia Communication across multiple standards and proprietary devices" filed on May 11, 2011 (issued as U.S. Pat. No. 9,035,997 on May 19, 2015), incorporated herein by reference in its entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;

(2) Scalable mixing and composition of the audio and video streams;

(3) Service delivered across the globe with minimized latency; and (4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
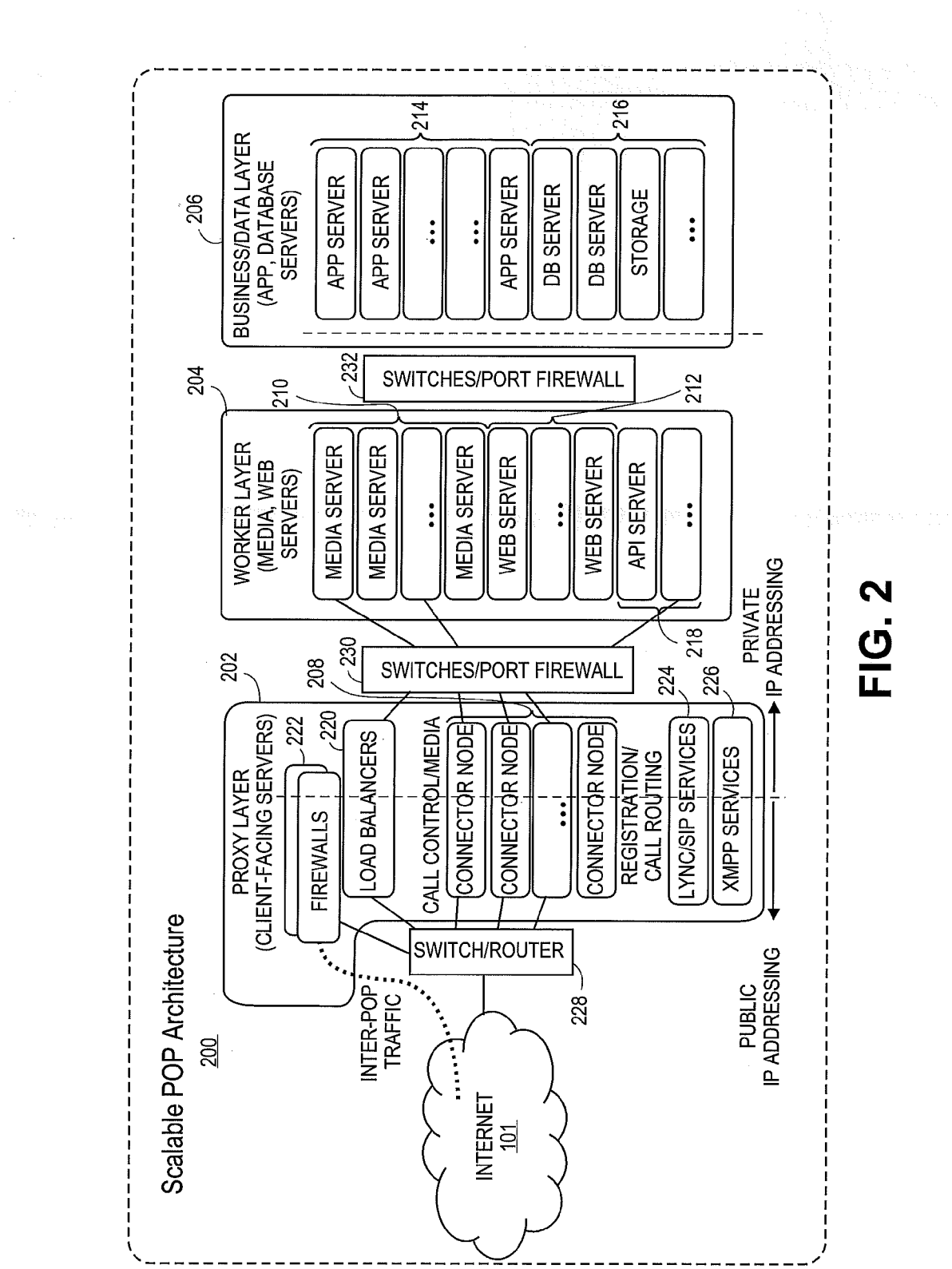
FIG. 2 depicts an exemplary system, in accordance with some embodiments of the invention.
Figure 3:
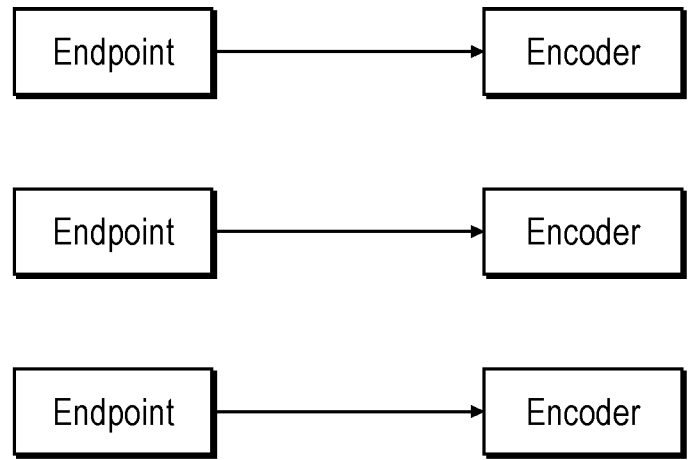
FIG. 3 depicts a system, in which there is a 1 to 1 mapping between endpoints and encoders.
Figure 4:
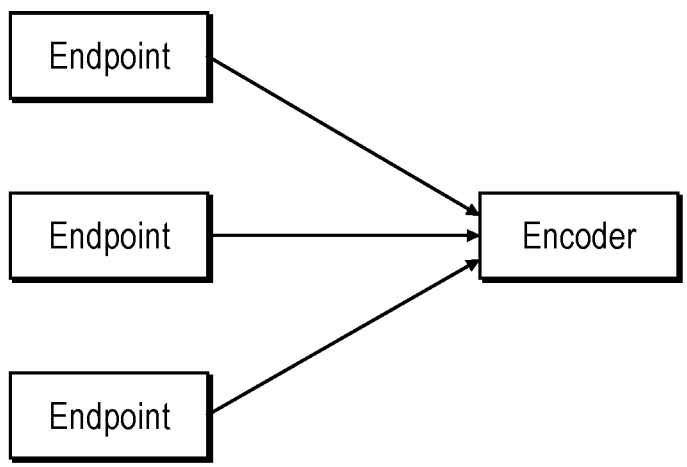
FIG. 4 depicts a system, in which there is an n to 1 mapping between endpoints and encoders.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but not limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.

(2) Sharing content with subsets of participants during the course of a call.

(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 5:
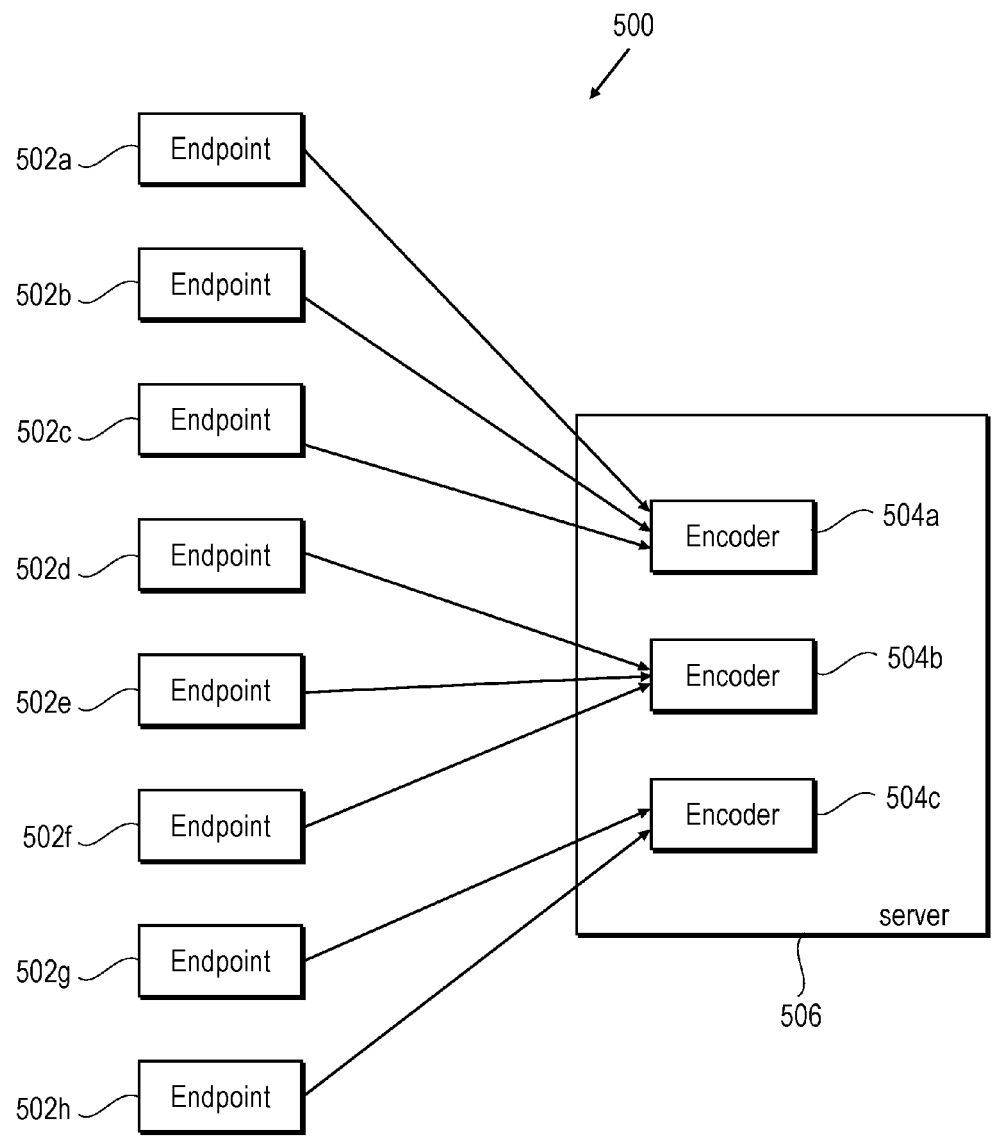
FIG. 5 depicts an exemplary system in which a plurality of endpoints are communicatively coupled with a plurality of encoders, in accordance with some embodiments of the invention.

As depicted in system 500 of FIG. 5, eight endpoints (502a, 502b, 502c, 502d, 502e, 502f, 502g, 502h) may be communicatively coupled to three encoders (504a, 504b, 504c). While eight endpoints and three encoders have been depicted, any number of endpoints and encoders may be present in system 500, so long as the number of endpoints is greater than the number of encoders. Encoders (504a, 504b, 504c) may be located on server 506 (or more generally, on one or more servers). Each endpoint may be communicatively coupled to an encoder via a network (not depicted).

In one embodiment of the present invention, the number of working points may be determined statistically in accordance with the capabilities of the endpoints. Such determination is described below in association with FIGS. 6-10.

Figure 6:
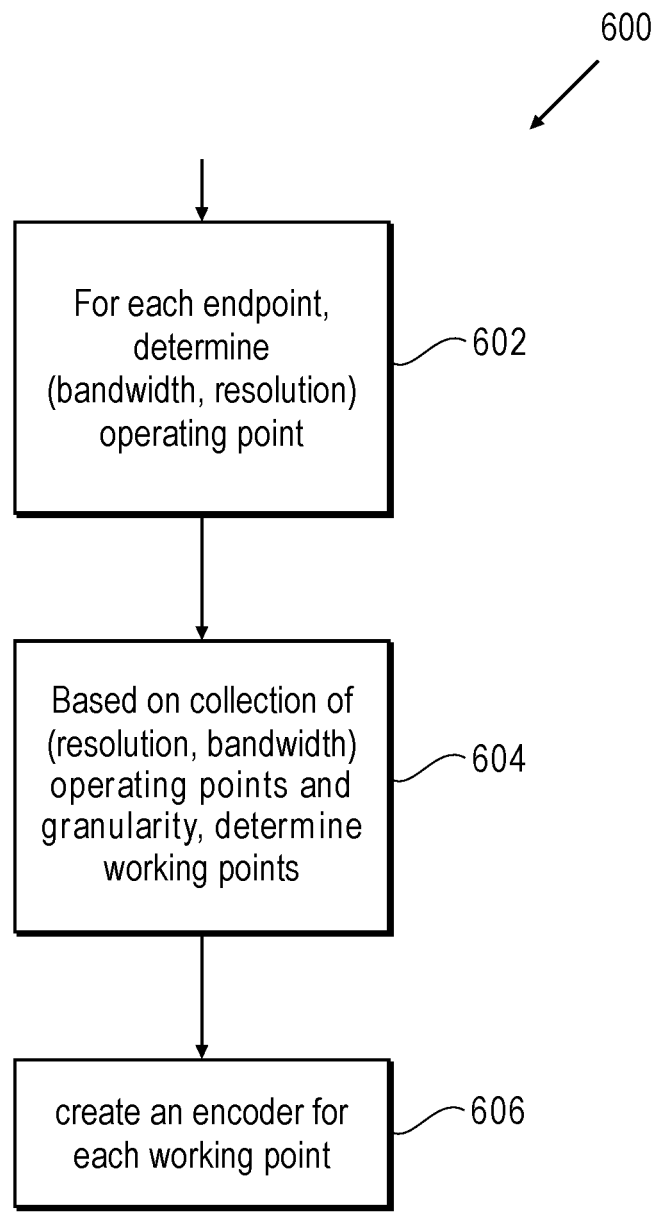
FIG. 6 depicts a flowchart of a method to determine one or more working points and create an encoder for each working point, in accordance with some embodiments of the invention.

As depicted in flowchart 600 of FIG. 6, server 506 may, for each endpoint of the video conference system, determine an operating point (step 602), particularly an operating point comprising the bandwidth and resolution associated with the endpoint. Further details for such determination are provided in FIG. 7. Based on (i) the operating point for each endpoint and (ii) a granularity parameter, the server may determine the number and type of working points (step 604). Further details for such determination are provided in FIGS. 8-10. Finally, the server may create an encoder for each working point (step 606).

Figure 7:
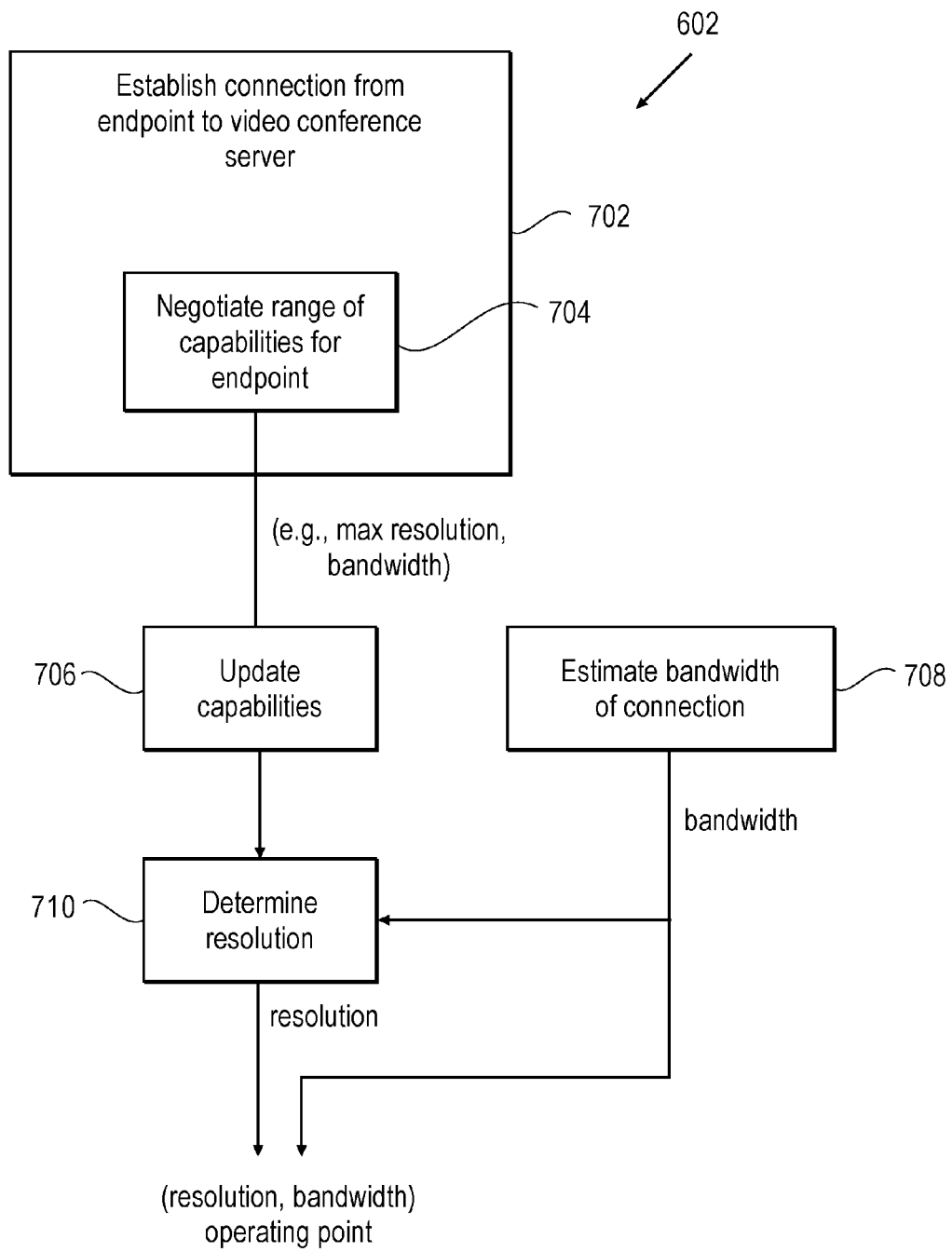
FIG. 7 depicts a flowchart of a method to determine an operating point of an endpoint, in accordance with some embodiments of the invention.

FIG. 7 depicts a flowchart for determining an operating point for an endpoint, in accordance with one embodiment of the invention. At step 702, the endpoint may establish a connection to the system. While establishing such connection, the endpoint may further negotiate its range of capabilities, such as the maximum resolution and bandwidth. The negotiated range of capabilities is usually indicated in the session description protocol (SDP) portion of a SIP or real-time streaming protocol (RTSP) connection, but could be indicated through other means such as the H.245 terminal capabilities message for H.323 endpoints.

At step 706 (e.g., at any time during a video conference call), the endpoint may update its capabilities (e.g., based on its own logic). Such updating of capabilities may be accomplished in various ways, depending on the protocol used. In SIP, Re-INVITE may be employed to update the endpoint capabilities; in H.323, a new terminal capabilities message may be employed to update the endpoint capabilities; and in other protocols, different types of flow control messages may be employed.

At step 708, the bandwidth of the connection between the endpoint and server 506 may be determined. For example, a bandwidth estimation algorithm (based on TCP Friendly Rate Control (TFRC) or a loss based algorithm) may be implemented by the server to estimate the bandwidth for a connection to a particular endpoint.

Figure 8:
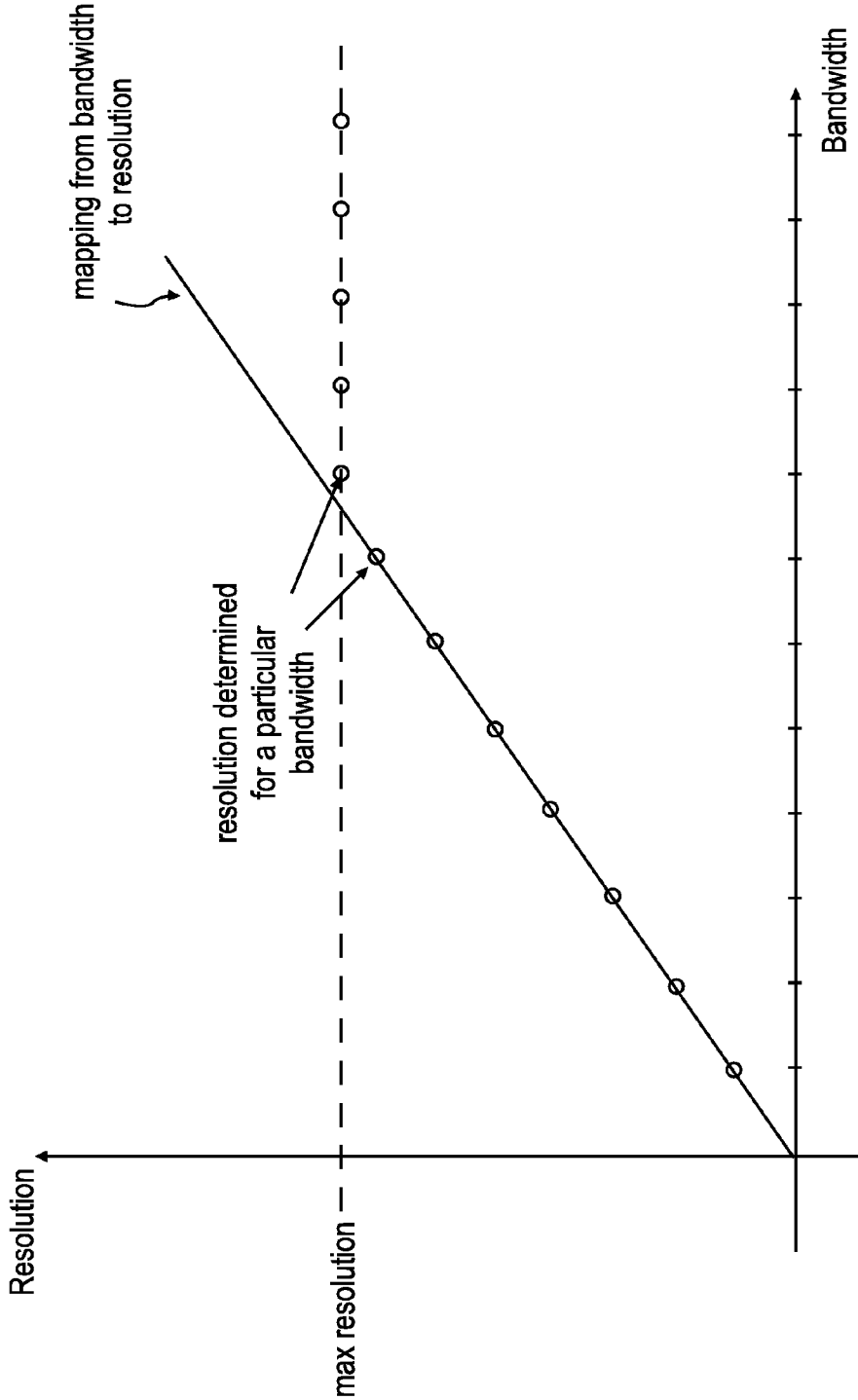
FIG. 8 depicts an exemplary plot of resolution versus bandwidth, to help describe the process for determining the resolution for an endpoint.

At step 710, the resolution for an endpoint may be determined. For example, a server may refer to a mapping from bandwidth to resolution (e.g., in the form of a table) in order to determine the resolution for an endpoint. An example mapping has been displayed in FIG. 8 for ease of explanation. The resolution determination may further take into account the negotiated range of capabilities (as determined in step 704). For instance, such determination may consider the maximum negotiated resolution (as depicted in FIG. 8). If a resolution for a particular bandwidth (e.g., determined via the mapping) exceeds the maximum negotiated resolution, the determined resolution may be the maximum negotiated resolution (as depicted in FIG. 8). Flowchart 602 of FIG. 7 concludes once an operating point for a particular endpoint has been determined.

Figure 9:
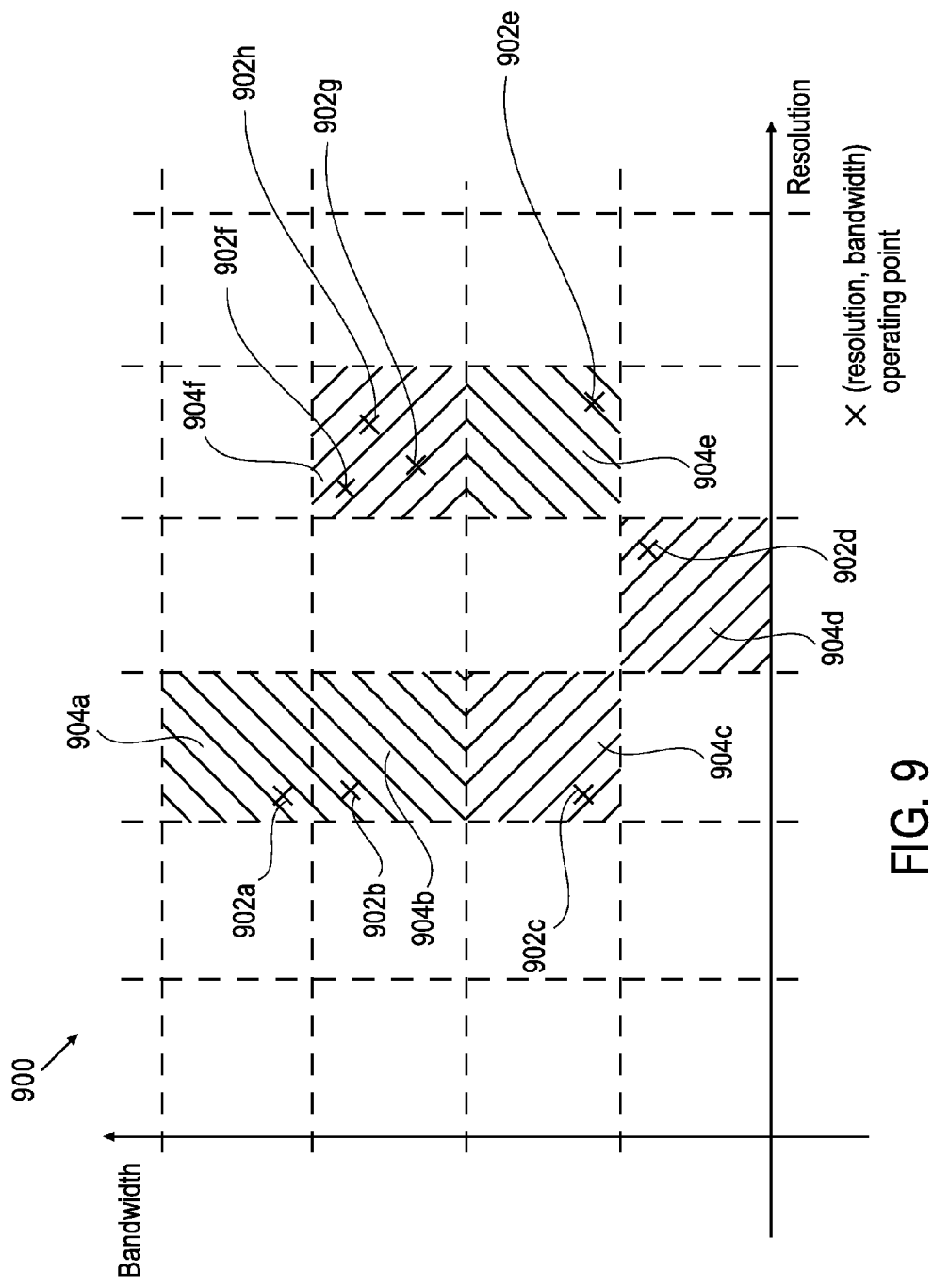
FIGS. 9-10 depict exemplary plots of bandwidth versus resolution, to help describe the process for determining the working points associated with a collection of endpoints.
Figure 10:
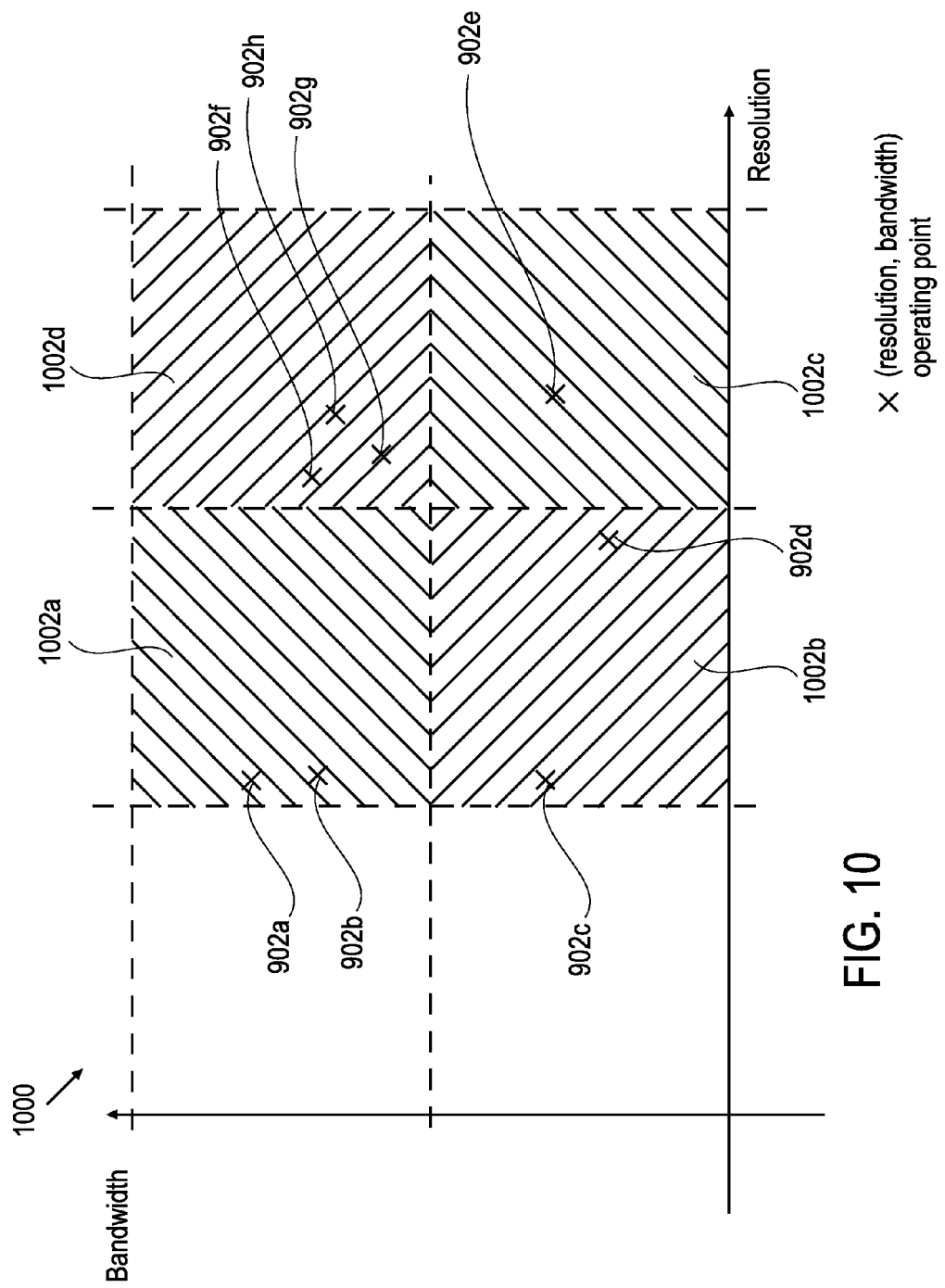

FIGS. 9-10 depict exemplary plots to help explain the determination of working points. In plot 900 of FIG. 9, the operating points for eight endpoints (902a, 902b, 902c, 902d, 902e, 902f, 902g, 902h) are depicted. The two-dimensional space of bandwidth versus resolution has further been divided into a set (e.g., a grid) of candidate "working points" (i.e., each candidate working point being a range of resolution and a range of bandwidth). In the example of plot 900, six working points are selected (904a, 904b, 904c, 904d, 904e, 904f), and an encoder is created for each working point (i.e., six encoders in total). More particularly, operating point 902a results in the selection of working point 904a; operating point 902b results in the selection of working point 904b; operating point 902c results in the selection of working point 904c; operating point 902d results in the selection of working point 904d; operating point 902e results in the selection of working point 904e; and operating points 902f, 902g and 902h result in the selection of working point 904f.

Assuming a correspondence between endpoint 502a and operating point 902a; 502b and operating point 902b, etc., endpoint 502a will be assigned the encoder associated with working point 904a; endpoint 502b will be assigned the encoder associated with working point 904b; endpoint 502c will be assigned the encoder associated with working point 904c; endpoint 502c will be assigned the encoder associated with working point 904c; endpoint 502d will be assigned the encoder associated with working point 904d; endpoint 502e will be assigned the encoder associated with working point 904e; and endpoints 502f, 502g and 502h will be assigned the encoder associated with working point 904f.

The determination of working points in FIG. 9 has been performed for a certain "granularity" setting (i.e., a set increment for bandwidth and a set increment for resolution). FIG. 10 depicts plot 1000 with a different granularity setting than FIG. 9. The eight operating points in FIG. 10 are identical to those of FIG. 9. However, the different granularity setting of FIG. 10 results in four working points (1002a, 1002b, 1002c, 1002d), and accordingly the creation of four encoders. Operating points 902a and 902b results in the selection of working point 1002a; operating points 902c and 902d results in the selection of working point 1002b; operating point 902e results in the selection of working point 1002c; and operating points 902f, 902g and 902h result in the selection of working point 1002d.

Based on the granularity setting of FIG. 10, endpoints 502a and 502b will be assigned the encoder associated with working point 1002a; endpoints 502c and 502d will be assigned the encoder associated with working point 1002b; endpoint 502e will be assigned the encoder associated with working point 1002c; endpoints 502c will be assigned the encoder associated with working point 1002c; and endpoints 502f, 502g and 502h will be assigned the encoder associated with working point 1002d.

The number of encoders created is on average always lower than having one encoder per endpoint and can be reduced considerably by limiting the number of supported resolutions and increasing the granularity of the bandwidth (i.e., using larger increments), as illustrated in FIG. 10).

One will observe that changing the capabilities of an endpoint may alter the number of working points. In one extreme case, all endpoints need a different working point so there is one encoder per endpoint (i.e., each operating point falls within it own "grid" in FIGS. 9-10). In the other extreme case, all endpoints have the same capabilities, so there is only one working point (and hence one encoder) for all endpoints (i.e., all operating points fall within one "grid" in FIGS. 9-10).

In one embodiment of the invention, a set of encoders may work in conjunction with one another, and there may be several ways to optimize the processing performed between the encoders. In one algorithm, each frame of a video data stream is encoded in the following manner. The working points are sorted by resolution, lowest resolution first. For each resolution, the working points are sorted by bandwidth, lowest bandwidth first. Using the working points of FIG. 9 as an example, the working points would be sorted as 904c, 904b, 904a, 904d, 904e and 904f. Each working point has an associated encoder. First, scene change detection is run once for all encoders. The first macroblock (MB) of the frame is encoded by the encoder with the lowest working point. The next encoder (i.e., with the next lowest working point) takes the result of the previous encoder. For mode decision, the next encoder uses the result of the previous encoder. In the case of inter-frame encoding, the encoder will start the motion estimation and mode decision search with the MB partitioning and motion vector of the previous encoder for the search (partitioning and motion vectors might have to be scaled appropriately if the encoder has a higher resolution than the previous encoder). This process repeats for each encoder for each MB of a frame and for each frame.

In another embodiment, it is possible to completely reuse the motion estimation performed by the encoder of the working point immediately preceding the current working point in order to provide even more CPU optimization at the cost of some quality.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 11:
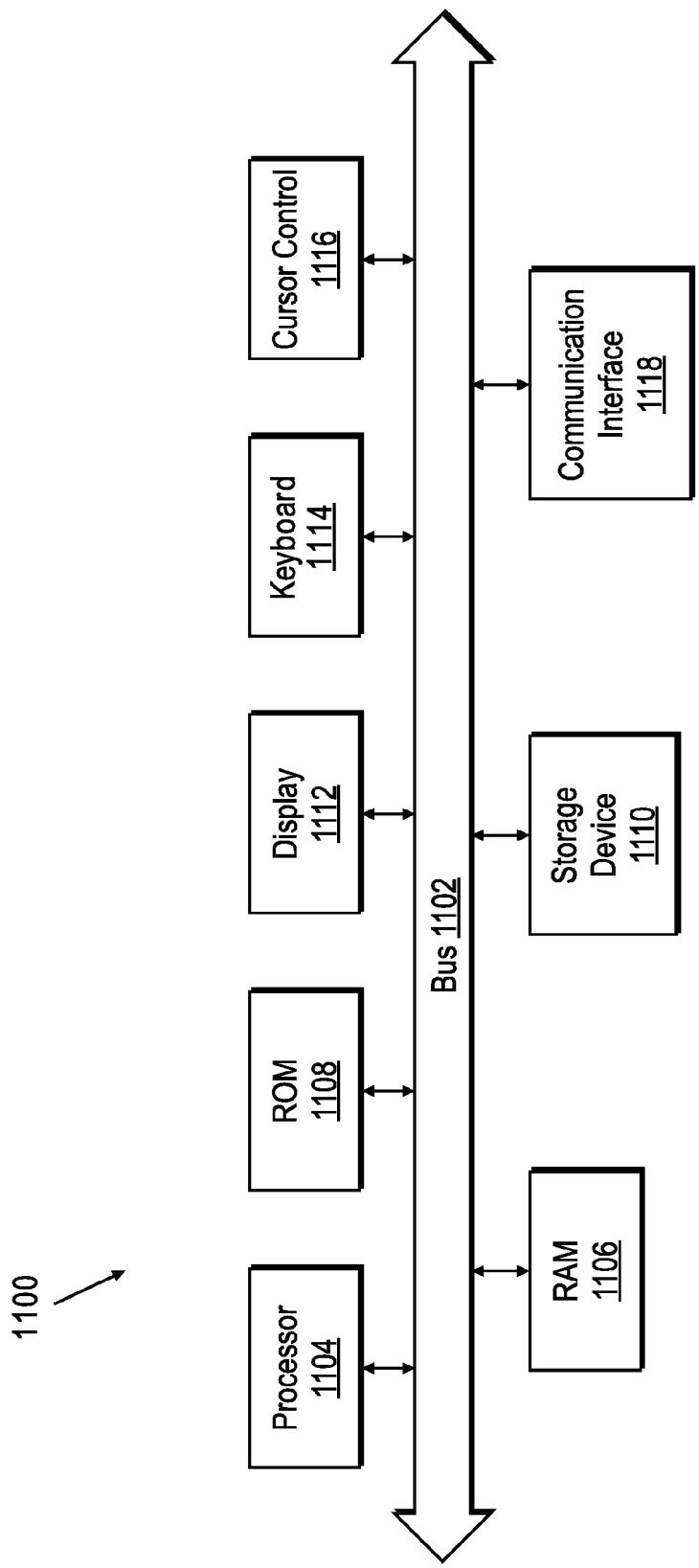
FIG. 11 depicts components of a computer system in which machine-readable instructions instantiating the methods of the present invention may be stored and executed.

Further the procedures described herein may involve the use of various computer systems and computer readable storage media having computer-readable instructions stored thereon. FIG. 11 provides an example of a computer system 1100 that is representative of any of the computer systems or electronic devices discussed herein. Note, not all of the various computer systems may have all of the features of computer system 1100. Computer systems such as computer system 1100 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1100 includes a bus 1102 or other communication mechanism for communicating information, and a processor 1104 coupled with the bus for processing information. Computer system 1100 also includes a main memory 1106, such as a random access memory (RAM) or other dynamic storage device, coupled to the bus for storing information and instructions to be executed by the processor. Main memory 1106 also may be used for storing temporary variables or other intermediate information during execution of instructions to be executed by processor 1104. Computer system 1100 may further include a read only memory (ROM) 1108 or other static storage device coupled to the bus for storing static information and instructions for the processor 1104. A storage device 1110, which may be one or more of a hard disk, flash memory-based storage medium, or other storage medium, may be provided and coupled to the bus 1102 for storing information and instructions (e.g., operating systems, applications programs and the like).

Computer system 1100 may be coupled via the bus 1102 to a display 1112, such as a liquid crystal or light emitting diode display, for displaying information to a user. An input device 1114, such as a keyboard including alphanumeric and other keys, may be coupled to the bus 1102 for communicating information and command selections to the processor. In some embodiments, the keyboard will be a software construct rendered via a touch screen display 1112. Another type of user input device is cursor control device 1116, such as a mouse, a trackball, cursor direction keys, and/or any other input device for communicating direction information and command selections to processor 1104 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 1104 executing appropriate sequences of computer-readable instructions contained in main memory 1106. Such instructions may be read into main memory from another computer-readable medium, such as storage device 1110, and execution of the sequences of instructions contained in the main memory may cause the processor to perform the associated actions. In alternative embodiments, hard-wired circuitry or firmware-controlled processing units (e.g., field programmable gate arrays) may be used in place of or in combination with processor 1104 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Computer system 1100 may also include a communication interface 1118 coupled to the bus 1102. Communication interface 1118 may provide a two-way data communication channel with a computer network, such as a network, which provides connectivity to and among the various servers and/or client devices discussed above. For example, communication interface 1118 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1100 can send and receive messages and data through the communication interface 1118 and in that way communication with hosts and/or client devices accessible via the Internet. Computer system 1100 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1100, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
   for each of a plurality of endpoints of a video conference, determining an operating point for the endpoint, wherein the operating point comprises a bandwidth and resolution associated with the endpoint;
   based on the operating points and a granularity setting, determining one or more working points, wherein each of the working points is defined by a range of resolution and a range of bandwidth, and wherein the range of resolution and the range of bandwidth is adjustable by the granularity setting;
   for each of the operating points, determining a corresponding working point for which the resolution and bandwidth of the operating point falls within the range of resolution and the range of bandwidth of the corresponding working point, respectively, wherein at least two of the operating points correspond to a single one of the working points;
   creating an encoder for each of the working points; and
   for each of the plurality of endpoints of the video conference, assigning the endpoint to the encoder created for the working point which corresponds to the operating point of the endpoint.

2. The method of claim 1, wherein the bandwidth associated with the endpoint is a bandwidth of a connection between the endpoint and a server.

3. The method of claim 2, wherein the resolution associated with the endpoint is determined from (i) the bandwidth of the connection between the endpoint and the server and (ii) a maximum resolution of the endpoint.

4. The method of claim 1, wherein a total number of the working points is dependent on the operating point of each of the endpoints.

5. The method of claim 1, wherein a total number of the working points is dependent on the granularity setting.

6. The method of claim 1, further comprising adjusting the granularity setting so as to increase a total number of the working points.

7. The method of claim 1, further comprising adjusting the granularity setting so as to decrease a total number of the working points.

8. A system, comprising:
   a processor;
   a storage device communicatively coupled to the processor; and
   a set of instructions on the storage device that, when executed by the processor, cause the processor to:
   for each of a plurality of endpoints of a video conference, determine an operating point for the endpoint, wherein the operating point comprises a bandwidth and resolution associated with the endpoint;
   based on the operating points and a granularity setting, determine one or more working points, wherein each of the working points is defined by a range of resolution and a range of bandwidth, and wherein the range of resolution and the range of bandwidth is adjustable by the granularity setting;
   for each of the operating points, determine a corresponding working point for which the resolution and bandwidth of the operating point falls within the range of resolution and the range of bandwidth of the corresponding working point, respectively, wherein at least two of the operating points correspond to a single one of the working points;

create an encoder for each of the working points; and for each of the plurality of endpoints of the video conference, assign the endpoint to the encoder created for the working point which corresponds to the operating point of the endpoint.

9. The system of claim 8, wherein the bandwidth associated with the endpoint is a bandwidth of a connection between the endpoint and a server.

10. The system of claim 9, wherein the resolution associated with the endpoint is determined from (i) the bandwidth of the connection between the endpoint and the server and (ii) a maximum resolution of the endpoint.

11. The system of claim 8, wherein a total number of the working points is dependent on the operating point of each of the endpoints.

12. The system of claim 8, wherein a total number of the working points is dependent on the granularity setting.

13. The system of claim 8, further comprising instructions on the storage device that cause the processor to adjust the granularity setting so as to increase a total number of the working points.

14. The system of claim 8, further comprising instructions on the storage device that cause the processor to adjust the granularity setting so as to decrease a total number of the working points.

15. A non-transitory machine-readable storage medium comprising software instructions that, when executed by a processor, cause the processor to:

for each of a plurality of endpoints of a video conference, determine an operating point for the endpoint, wherein the operating point comprises a bandwidth and resolution associated with the endpoint;

based on the operating points and a granularity setting, determine one or more working points, wherein each of the working points is defined by a range of resolution and a range of bandwidth, and wherein the range of resolution and the range of bandwidth is adjustable by the granularity setting;

for each of the operating points, determine a corresponding working point for which the resolution and bandwidth of the operating point falls within the range of resolution and the range of bandwidth of the corresponding working point, respectively, wherein at least two of the operating points correspond to a single one of the working points;

create an encoder for each of the working points; and for each of the plurality of endpoints of the video conference, assign the endpoint to the encoder created for the working point which corresponds to the operating point of the endpoint.

16. The non-transitory machine-readable storage medium of claim 15, wherein the bandwidth associated with the endpoint is a bandwidth of a connection between the endpoint and a server.

17. The non-transitory machine-readable storage medium of claim 16, wherein the resolution associated with the endpoint is determined from (i) the bandwidth of the connection between the endpoint and the server and (ii) a maximum resolution of the endpoint.

18. The non-transitory machine-readable storage medium of claim 15, wherein a total number of the working points is dependent on the operating point of each of the endpoints.

19. The non-transitory machine-readable storage medium of claim 15, wherein a total number of the working points is dependent on the granularity setting.

20. The non-transitory machine-readable storage medium of claim 15, further comprising software instructions that cause the processor to adjust the granularity setting so as to increase a total number of the working points.

* * * * *